Figure 1:
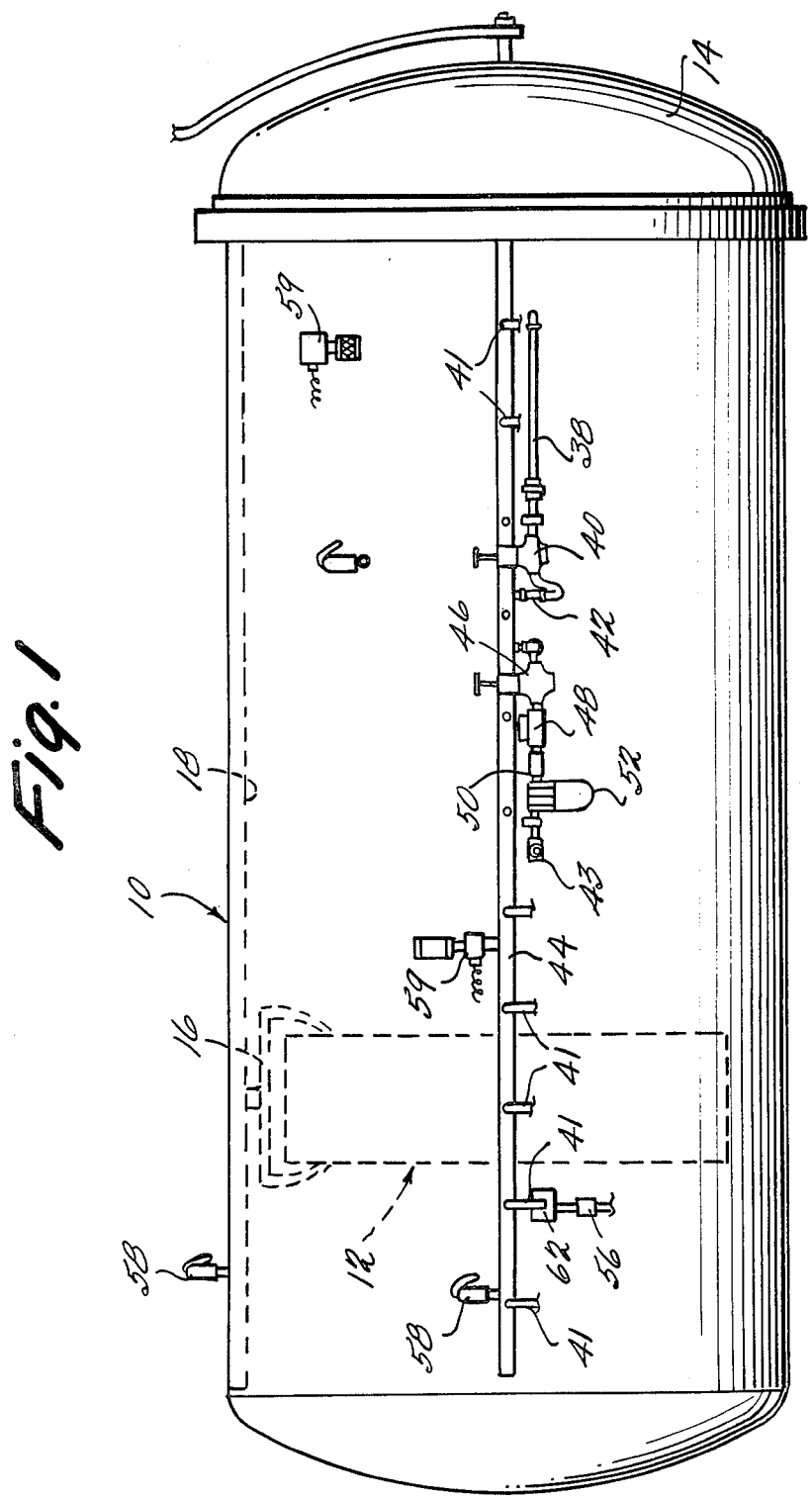

United States Patent [19]

Brodie et al.

[11] 4,203,793

[45] May 20, 1980

[54] PRESSURE VESSEL SYSTEM FOR RETREADING TIRES

[75] Inventors: Edwin T. Brodie; Donaldee Brewer, both of Muscatine, Iowa

[73] Assignee: Bandag Incorporated, Muscatine, Iowa

[21] Appl. No.: 867,611

[22] Filed: Jan. 6, 1978

Related U.S. Application Data

[62] Division of Ser. No. 622,419, Oct. 14, 1975, Pat. No. 4,075,047.

[51] Int. Cl.$^2$ ............................................. B29H 17/36
[52] U.S. Cl. ...................................... 156/394; 156/96; 157/1.1
[58] Field of Search .......................... 156/96; 126–129, 156/285–287, 381, 382, 394; 23/290, 291; 157/1.1, 1.17, 1.2, 1.21, 11; 425/18, 23, 24, 38, 48

[56] References Cited

U.S. PATENT DOCUMENTS

| | | | |
|---|---|---|---|
| 2,976,910 | 3/1961 | Nowak | 156/96 |
| 3,236,709 | 2/1966 | Carver | 156/128 |
| 3,325,326 | 6/1967 | Schelkmann | 156/96 |
| 3,743,564 | 7/1973 | Gross | 156/394 |
| 3,745,084 | 7/1973 | Schelkmann | 156/96 |
| 3,752,726 | 8/1973 | Barefoot | 156/96 X |
| 3,769,121 | 10/1973 | Martin | 156/96 |
| 3,884,739 | 5/1975 | Hindin et al. | 156/96 |

FOREIGN PATENT DOCUMENTS 866405  4/1961  United Kingdom ...................... 156/96

OTHER PUBLICATIONS

Instruction Manual, "Pressure Chamber 103A/104A", Bandag Inc., Muscatine, Iowa (general assembly diagram).
Instruction Manual, "Pressure Chamber 75 & 76", Bandag Inc., Muscatine, Iowa, (general assembly diagram).
"Pressure Chamber Instruction Manual Model 24 & 25", Bandag Inc., Muscatine, Iowa 8/1971, p. 5.
Bandag, Inc. Annual Report 1970.

*Primary Examiner*—John E. Kittle
*Attorney, Agent, or Firm*—Cushman, Darby & Cushman

[57] ABSTRACT

Tire casings are retreaded with precured tread strips in a heated pressure vessel provided with pressure connections which effect simultaneous inflation of the tires and pressurization of the vessel while maintaining tire pressure above vessel pressure. Subsequently a pressure relief system permits the tires to exhaust faster than the vessel. Each tire is prepared for retreading by applying a bonding medium between the tire periphery and the retread strip and wrapping the resulting assembly with a fluid impervious flexible cover. Tread stabilization rings, wick material and non-stick polymer film may be inserted between the tread strip and the cover.

6 Claims, 2 Drawing Figures

PRESSURE VESSEL SYSTEM FOR RETREADING TIRES

This is a division of application Ser. No. 622,419 filed Oct. 14, 1975 now U.S. Pat. No. 4,075,047.

This invention relates to methods for bonding precured rubber tread strips to tire casings.

In the known technique of bonding a precured rubber tread strip to a tire casing, the bonding operation is carried out by interposing a self-vulcanizing bonding material between the tire casing and the tread strip and by pressing the tire casing and tread strip together while applying sufficient heat to cause vulcanization of the bonding material. The pressing operation is generally carried out by means of a differential fluid pressure applied between the inside of the tire casing and the outside of the tread strip, and means are provided for venting air from between the cover and the strip. One difficulty which sometimes arises is that the bond between tire casing and tread strip is not uniformly strong at all points with the result that the bond may fail during subsequent use of the tire. Another difficulty which may arise is that the tread strip may become distorted or slightly displaced during the pressing and heating operation with the result that the vulcanized assembly is unsatisfactory. One cause of a poor bond is the presence of air between the tire casing and tread strip during vulcanization. Distortion or displacement of the tread strip generally results from non-uniformity of pressure during vulcanization. When the vulcanizing operation is carried out in a pressure chamber large enough to receive a plurality of tires, a further problem is that each tire may not receive the same heat and differential pressure treatment.

Distortion during vulcanization may also result from the inherent flexibility of the tread strip, and this problem is more likely to occur when the outer surface of the tread strip has been previously slitted with a large number of parallel slits for the purpose of increasing traction and wear life. The slitting operation itself may introduce a separate problem in that the slits form the tread ribs into a large number of tread lugs which may be torn away from the undertread portion during use of the tire, unless the slitting operation has been performed properly.

Removal of air is most readily effected by covering the tread strip and at least the adjacent side walls of the tire casing with a flexible impervious cover or envelope, sealing the cover to the tire and effecting a differential pressure between the interior and exterior of the cover as by applying fluid pressure to the exterior of the cover or applying a vacuum to the space between the cover and the assembly of tire casing and tread strip or a combination of both fluid pressure and vacuum applied sequentially or simultaneously. In either case the air is exhausted through a suitable conduit which is in communication at one end with the space. The pressing and vulcanizing operation may be carried out using the same fluid pressure differential technique or by means of mechanical pressure. Examples of different air expulsion and/or pressing operations are more fully described in U.S. Pat. Nos. 2,976,910 (Nowak), 3,236,709 (Carver), 3,325,326 (Schelkmann), 3,752,726 (Barefoot), and 3,745,084 (Schelkmann).

It has been recognized, for example, in the aforenoted U.S. Pat. Nos. 3,325,326 and 3,745,084 that the pressing together of the tread strip and tire casing may sometimes produce variations in the pressure being applied at different locations, with the result that the bonding medium and/or the tread are distorted or shifted during bonding. The resulting product may be unsatisfactory in having a nonuniform bond between tread and tire casing or in having other defects. The problem is thought to arise because pressure is exerted by whatever pressing element is used only on the outer surfaces of the tread profiles. In spite of the air removal operation some air may remain in the tread profiles with a resulting reduction in the pressure transmitted to those portions of the tread strip and those portions of bonding material lying directly below the circumferential tread grooves. The solution proposed by U.S. Pat. No. 3,325,326 is to first apply a vacuum inside the envelope and fluid pressure to the exterior of the envelope and then increase the pressure inside the envelope. The solution proposed by U.S. Pat. No. 3,745,084 is to assure that the envelope penetrates to the bottom of the grooves.

An important aspect of the invention is the structure and operation of an improved pressure chamber which controls the application and removal of pressure and heat during the bonding operation. Heretofore the retreading of a plurality of tires simultaneously in a single pressure chamber relied on the manipulation of hand-operated valves to control differential pressure during inflation and deflation of the tires. This sometimes resulted in a wide variation in inflation rates for different tires in the pressure chamber and in slow reduction of the pressure differential after bonding. These procedures required considerable personnel time, and in addition the variables introduced into the bonding operation sometimes led to tread and tire distortions and poor air exhaustion. For example, if tire pressure was too low a poor bond might result along the center of the periphery of the tire. If insufficient air was removed a poor bond along the shoulder might result.

The present invention provides a pressure chamber which operates automatically to apply a uniform heat and pressure treatment to all tires in the chamber. In order to pressurize the chamber and simultaneously inflate the tires while maintaining inflation pressure higher than chamber pressure, the system provides a common fluid pressure manifold connected to each tire individually and to the chamber, together with a pressure differential check-valve and pressure-regulating devices arranged to assure that the tires are always pressurized to a higher pressure than the chamber. The chamber temperature is controlled and recorded automatically throughout the process. Upon completion of the bonding operation a timer and special exhaust valve arrangement permit the tires to exhaust more rapidly than the chamber pressure so that the chamber pressure causes partial collapse of the tires thereby rendering them loose on their rims. Alternatively a degree of tire pressure may be maintained so that the tires are still partially inflated when they are removed from the chamber. This is desirable when the tires are to be allowed to cure for an additional period of time, in an inflated condition while cooling.

Figure 2:
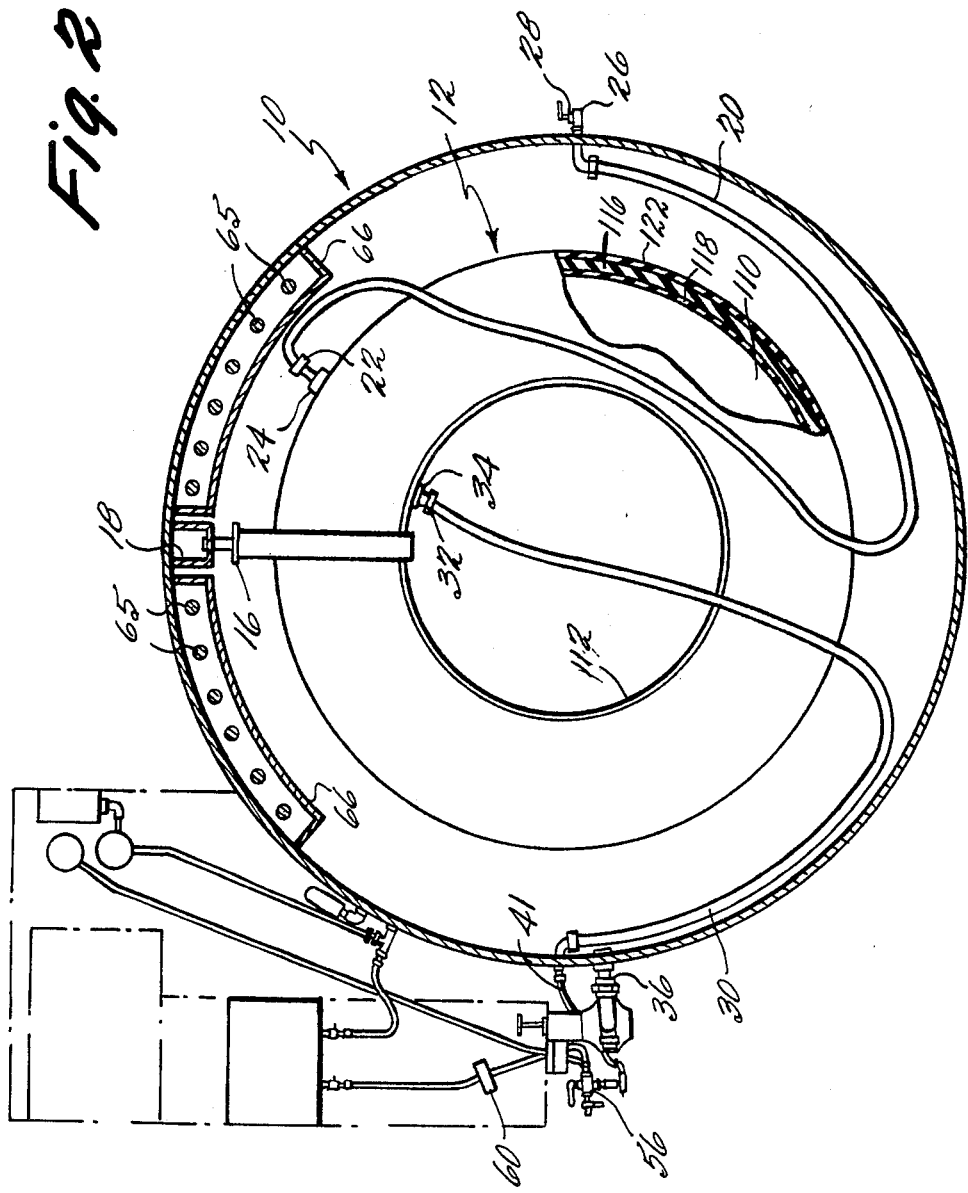

In the drawings:

FIG. 1 is a schematic side view of a pressure chamber for carrying out a bonding operation on a plurality of tires; and FIG. 2 is a schematic end view of the pressure chamber of FIG. 1.

FIGS. 1 and 2 illustrate a cylindrical pressure vessel 10 of sufficient size to receive a plurality of assemblies 12. Each assembly includes a tire casing 110, a tread strip 116, and a layer of vulcanizable material 118 interposed between the tread strip 116 and the tire 110. One end of the vessel 10 is provided with a door 14 so that each assembly 12 mounted on a rack 16, which is movable along a track 18, may be placed in and withdrawn from the vessel 10.

Overlying the tread strip 116 and the side walls of the tire casing 110 is a pressing element in the form of a flexible rubber annular envelope 122 which extends around the circumference of the tire and tread assembly. The edges of the envelope 122 are temporarily sealed to the side walls of the tire casing 110, as by being clamped between the side walls and a rim 112. For each assembly 12 the pressure vessel 10 is provided with a flexible vent line 20 having an inner end 22 adapted to be releasably connected to a vent element 24 in the cover 122 of the respective assembly 12. The outer end 26 of the vent line 20 communicates with the atmosphere by way of a shut-off valve 28. For inflating the tire of each assembly 12 the vessel 10 is provided with a flexible line 30 having an inner end 32 fitting adapted to be connected to the tire inflating element 34 of the respective assembly 12. The fitting 32 includes a check valve which prevents flow of pressure fluid from the line 30 when the line 30 is not connected to the assembly 12.

The system for supplying fluid pressure to the interior of the vessel 10 and for inflating the tire 110 of each assembly 12 includes a manifold 44 which receives fluid pressure from an assembly provided with an inlet fitting 43 adapted to be connected to a pressure source such as compressed air. From the fitting 43 the fluid passes through a filter 52, a check valve 50, a solenoid valve 48 and a pressure regulator 46 into the manifold 44. Each of the several tire-inflation lines 30 is connected to the manifold 44 by a line 41 which includes a solenoid valve 62 to a manual shut-off valve 56. The assembly which transmits fluid from the manifold 44 and the interior of the vessel includes a differential check valve 42, a pressure regulator 40 and a pipe 38 connected to the vessel 10 by a fitting 36. With appropriate valving changes pressure fluids other than air can be used.

The manifold 44 and the vessel 10 are provided with pressure relief valves 58 and with solenoid-operated exhaust valves 59 which exhaust to atmosphere.

Resistance heating elements 65 are located within the vessel 10 for heating the interior of the vessel 10 to appropriate vulcanizing temperatures of 190° F. to 212° F. The heating elements 65 are protected from damage by perforated metal grids 66.

Operation of the vessel 10 is as follows: Several tire assemblies 12 are moved through the door 14 into the vessel 10 by sliding the respective supporting rack 16 along the fixed track 18. The vent conduits 20 and the pressure conduits 30 are connected to the fittings 24 and 34, respectively. The valves 48 and 62 are open. Fluid under pressure, for example air at 110 psi (pounds per square inch), is then supplied to the fitting 43 so as to pressurize the manifold 44 and to begin inflating the tires and pressuring the vessel 10. The pressure in the vessel 10, and hence the pressure on the exterior of the assemblies 12, is maintained 15 to 20 psi less than the inflation pressure of the assemblies by means of the differential check valve 42. This valve 42 remains closed if the pressure differential across its valve seat is less than about 15–20 psi, and it opens if the differential is greater than about 15–20 psi. Thus, this valve opens and allows air to enter the vessel 10 after a preset pressure has been obtained in the manifold 44. If the pressure in the vessel 10 increases over the preset differential pressure, the valve 42 closes by spring pressure and the tire assemblies 12 continue to inflate until the differential pressure is again over that at which the valve 42 is set to open. The valve 42 then opens and again allows air to pass into the vessel 10.

At the same time the interior of the chamber 10 is heated to 190° F. to 212° F. by the electric resistance elements 65 which are automatically controlled by a thermostat (not shown).

This differential pressure is maintained throughout the bonding process by the pressure regulators 40 and 46. The pressure differential is necessary to maintain the correct tire configuration and to effect a seal of the cover 122 to the tire 110. The greater pressure on the cover 122 forces all the air out from between the cover 122 and the tire 110 and this air flows to the atmosphere through the conduit 20. Simultaneously, the tread strip 116 is pressed against the tire 110 and the bonding medium 118 vulcanizes.

At the completion of the bonding operation a timer 60 is energized and allows the vessel 10 and the manifold 44 to exhaust. Each assembly 12 also exhausts through the conduit 30 and the respective valve 56 to the manifold 44. Due to the relative size of the exhaust ports the assemblies 12 become exhausted before the vessel 10. This allows the pressure in the vessel 10 to collapse the tire 110 of each assembly and to thereby aid in unseating the tire from its rim 112.

Alternatively, by providing a solenoid valve 62 the tires 110 may be re-inflated automatically at the end of the bonding process to a preset pressure and allowed to cool. Another alternative is to stop the exhausting of the tires at a preset pressure.

Yet another alternative is to reinflate the collapsed tires 110 outside the vessel 10 to a desired pressure and allow them to cool.

The reason for these alternatives is to provide inflation after bonding (post cure inflation) in order to reduce or eliminate shrinkage during the time the tire 110 is cooling. This is a particularly useful technique for passenger car tires and light truck tires.

What is claimed is:

1. Apparatus for bonding a precured tread strip to a tire by means of a vulcanizable bonding material interposed between the tread strip and the tire, said apparatus comprising: a vessel for receiving a tire and tread assembly; pressure fluid conduit means having an inlet for receiving pressure fluid from a source thereof, said conduit means including a first pressure regulator and a manifold connected to said first pressure regulator to receive pressure fluid therefrom; means for passing pressure fluid from said manifold to the interior of said vessel, said means including in flow sequence a differential pressure check valve and a second pressure regulator; and a tire-inflating conduit connected to said manifold, said inflating conduit having an end located in said vessel and connectable to the interior of a tire in said vessel, the arrangement of said pressure regulators and said pressure differential check valve being such that during pressurization of said manifold by way of said first pressure regulator, the pressure fluid flows simultaneously from said manifold to said inflating conduit and to said vessel and such that thereafter the pressure in said vessel is maintained at a lower value than the pressure in said inflating conduit.

2. Apparatus as in claim 1 including means for exhausting said tire-inflating conduit in a manner such that during exhaustion vessel pressure exceeds tire pressure by an amount sufficient to cause partial collapse of the tires.

3. Apparatus as in claim 1 wherein there are a plurality of said tire-inflating conduits connecting with said manifold.

4. Apparatus as in clim 3 including means for exhausting said tire-inflating conduits in a manner such that during exhaustion vessel pressure exceeds tire pressure by an amount sufficient to cause partial collapse of the tires.

5. Apparatus for bonding a precured tread strip to a tire by means of a vulcanizable bonding material interposed between the tread strip and the tire, said apparatus comprising: a vessel for receiving a tire and tread assembly; a tire-inflating conduit for inflating a tire in said vessel; fluid pressure supply means for pressurizing the interior of said vessel and for pressurizing said tire-inflating conduit to superatmospheric pressure; and pressure exhaust means for exhausting said tire-inflating conduit and said vessel in a manner such that during exhaustion the vessel pressure exceeds the pressure in said tire-inflating conduit by an amount sufficient to cause partial collapse of the tire.

6. Apparatus as in claim 5 wherein said exhaust means operates to exhaust said inflating conduit faster than said vessel.

* * * * *